Patented Aug. 19, 1947

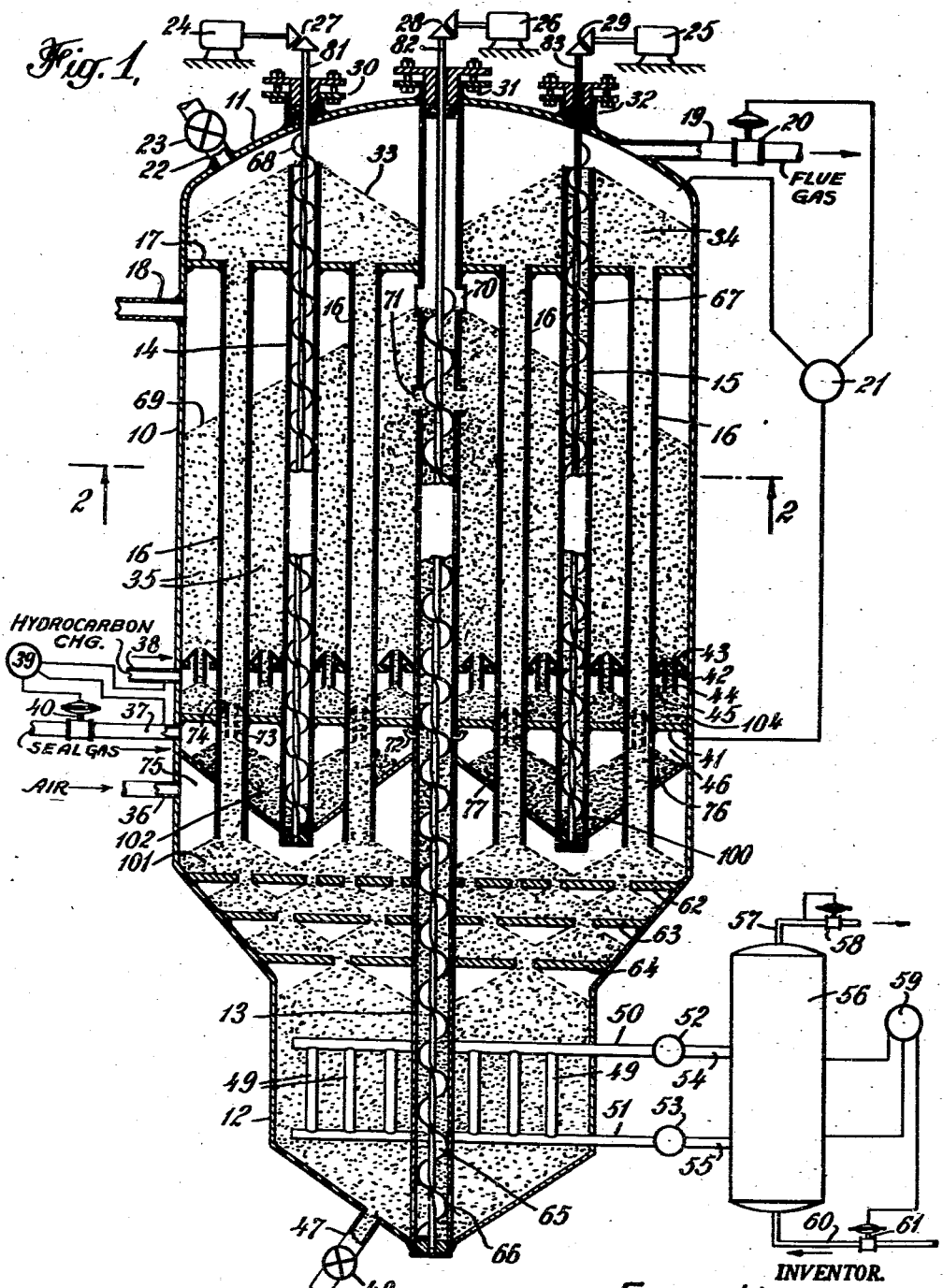

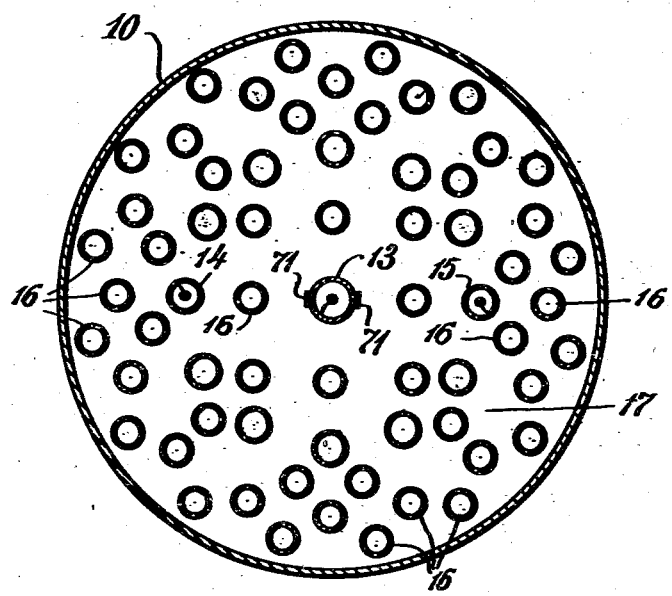

2,425,969

UNITED STATES PATENT OFFICE 2,425,969

METHOD AND APPARATUS FOR CONDUCTING GASEOUS REACTIONS IN THE PRESENCE OF SOLID PARTICLES

Ernest Utterback, Upper Darby, Pa., assignor to Socony-Vacuum Oil Company, Incorporated, a corporation of New York Application April 20, 1944, Serial No. 531,924

16 Claims. (Cl. 196—52)

This invention has to do with a method and apparatus for conducting gaseous conversions in the presence of a moving particle form solid contact mass material which may or may not be catalytic in character. Exemplary of such processes is the catalytic hydrogenation, dehydrogenation, desulfurization, reforming, polymerization, alkylation or cracking of hydrocarbons. Typical is the cracking conversion of hydrocarbons, it being well known that gas oils boiling between approximately 500° F. and 750° F. may be substantially cracked to gasoline, gas and heavier products by passing them at reaction conditions of temperature and pressure such as, for example, temperatures of the order of 875° F. at pressures somewhat above atmospheric in contact with a solid adsorptive catalytic contact mass. Usually such contact masses partake of the nature of natural or treated clays such as fuller's earth or Superfiltrol which is a treated natural silica-alumina clay or of synthetic associations of alumina, silica or alumina and silica, any of which may have other constituents added such as certain metallic oxides. During the conversion reaction certain cokey materials may be deposited upon the catalytic material thereby impairing its catalytic efficiency. This necessitates periodic regeneration of the catalytic material. Recently the process has been developed as one in which the particle form solid contact mass material is moved cyclically through two zones in the first of which it is subjected to gaseous conversion and in the second of which it is subjected to the action of a fluid regeneration medium, such as a combustion supporting gas, acting to burn off contaminant material deposited upon the contact mass during conversion. Such cyclic systems in which the solid material is continuously moving, when used for many reactions, such as the cracking conversion of hydrocarbon vapors, have been found to offer many advantages over the older type systems wherein an in situ catalytic material was subjected to alternate conversion and regeneration reactions. These advantages need not be dealt with herein, as the present commercial success of the moving solid type systems bears out the statement. When the particle form solid catalytic material to be employed is of a particle size larger than a pulverized powder, it has been found desirable to conduct such material through the conversion and regeneration zones as substantially compact columns of moving particle form material. Such systems are particularly desirable in order to limit the rate of attrition of the particle form catalytic material and the erosion of the equipment. Commercially the regeneration and conversion reactions are conducted in separate vessels having auxiliary solid feed and discharge chambers, and suitable externally located solid material conveyors are provided to complete the solid material cyclic system.

In the case of catalytic cracking of hydrocarbon oils, the overall reaction has been found to be endothermic requiring the supply of a considerable quantity of heat, whereas in the case of the catalyst regeneration by combustion of deposited contaminant therefrom the overall reaction is exothermic resulting in the liberation of considerable quantities of heat. Present practice is to supply the heat for the endothermic conversion either by superheating the hydrocarbon charge to the conversion zone to a temperature somewhat above the desired average conversion temperature or by provision of heat transfer tubes within the conversion zone through which tubes an externally heated heat transfer fluid is circulated. Since the quantity of heat liberated in the contaminant combustion reaction is generally sufficient, if not removed, to heat the solid catalytic material to temperatures at which the catalytic activity of the material would be permanently impaired, it has also been a practice to remove this heat by means of an externally cooled heat exchange fluid passed through heat transfer tubes placed within the regeneration zone or between small regeneration stages. The necessity for the provision of such heat transfer tubes and auxiliary external heat transfer fluid circulation systems greatly adds to the complexity and cost of the apparatus required for such reactions. It has been found, however, that properly designed cyclic conversion units wherein the solid passes through the conversion and regeneration vessels and wherein such auxiliary heat transfer systems are employed are reasonably economical as regards construction and operation when built in large sizes, for example, of 10,000 barrels per day feed stock capacity (measured as liquid 42 gallon barrels). However, when the size of such units is reduced to say 1,000 to 4,000 barrels per day capacity, the reduction in capital cost is considerably less than that of the capacity. This latter difficulty is even more markedly noticeable in catalytic conversion units of other types, and as a result, there is a pressing need for a reasonably inexpensive and simple hydrocarbon conversion process and apparatus suitable for small petroleum refineries. The present invention is specifically directed toward such a method and apparatus wherein a particle form solid contact mass is cyclically passed as substantially compact columns through conversion and regeneration zones.

A major object of this invention is the provision of a simple, compact inexpensive apparatus for conversion of hydrocarbons in the presence of a substantially compact column of moving particle form solid contact material, which apparatus is adapted to the requirements of small refineries.

Another object of this invention is the provision of a method and apparatus for conducting endothermic and exothermic reactions in the presence of a moving particle form solid material wherein the heat liberated by the exothermic reaction is made available for the endothermic reaction without the use of tubes for fluid heat transfer medium flow within the reaction zones.

Another object of the invention is the provision, within an operation wherein a moving particle form solid contact mass material is cyclically passed through endothermic and exothermic reaction zones in heat exchange relationship with each other, of a simple method for thermally balancing the two opposite thermochemical reactions.

Still another object of the invention is the provision of an apparatus for catalytic hydrocarbon conversion or treatment wherein within a single vessel a particle form solid catalytic material may be passed cyclically through a hydrocarbon conversion zone and a catalyst regeneration zone, said zones being in heat exchange relationship with each other.

Another object of this invention is the provision of an apparatus for catalytic hydrocarbon conversion which may be readily tied in with existing thermal cracking stock preparation and product fractionation equipment.

Another object of the invention is the provision within an apparatus of the type above described of a conveyor construction particularly adapted to convey said solid material between zones as a substantially compact column of solid material without excessive attrition of said solid material.

Still another object of the invention is the provision in an apparatus of the type above described of a novel device for admitting and distributing vapors to the conversion or regeneration zones.

These and other objects of this invention will become apparent from the following description of this invention.

In order to better understand this invention reference should now be made to the attached drawings of which Figure 1 is an elevational view, partially in section of a typical form of the apparatus of this invention, Figure 2 is a plan view of this apparatus taken at line 2—2 of Figure 1. Figure 3 is a detailed enlarged view of a vapor distributing device used in this apparatus and Figure 4 is a detailed view of part of one of the conveyors used in this apparatus showing the special construction thereof. All of these drawings are highly diagrammatic in character.

Turning now to Figure 1, we find a vertical cylindrical vessel 10 closed on its upper end by a rounded top 11 and reduced in diameter at its lower end so as to terminate in the reduced bottom section 12. A horizontally extending partition 17 is supported across the vessel near the upper end thereof, thereby providing chamber 34 suitable for confining a bed of particle form solid material. Depending from said partition are a plurality of uniformly distributed pipes 16 which terminate within the lower end of said vessel. These pipes provide confined vertical passageways for solid material flow from the chamber 34 to the restricted bottom section 12 of the vessel and at the same time comprise the regeneration zone. These tubes may be provided with internal or external fins to aid heat transfer between the regeneration zone formed thereby and the hereinafter described adjacent conversion zone. Extending centrally through the vessel 10 is the vertical conveyor casing 13. A plurality of horizontal apertures 66 are provided in this casing near its lower end for admittance of solid material thereinto. A number of vertically spaced discharge ports 70, 71 are provided on the casing at levels below the partition 17 for discharge of solid material into the space provided within said vessel 10 not occupied by the pipes 16, the upper portion of said space comprising the conversion zone as will be hereinafter shown. A screw type conveyor comprising a central drive shaft 82 and a special spiral flange 65 attached along most of the length thereof is provided within the casing 13. This conveyor will be further described hereinafter. The conveyor drive shaft 82 extends through the top of the vessel through the stuffing box 31 and is connected by a gear arrangement 28 to drive motor 26. Downwardly sloping converging partitions 76 and 77 are positioned across the annular space within the vessel 10 shortly above the lower ends of the pipes 16 thereby partitioning the zone 35 from the bottom section 12 of the vessel. Conveyor casings 14 and 15 extend upwardly from this latter partitioning to a level within the chamber 34. These casings are also provided with apertures such as aperture 100 near the lower ends thereof for admittance of solid material, and the casings are open on their upper ends to permit discharge of solid material into chamber 34. These casings are braced within the vessel by partition 17. Screw conveyors, similar to the one within casing 13 are provided within each of said casings and the drive shafts 81 and 83 thereof extend through stuffing boxes 30 and 32 in the top of the vessel. These drive shafts are driven through gear arrangements 27 and 29 by motors 24 and 25, respectively. The drive motors on all of the conveyors are of an adjustable speed type for reasons to be explained hereinafter. In place of variable speed motors, constant speed motors connected through adjustable speed drive mechanisms to the conveyor shafts may also be used. As will be hereinafter shown, the conveyor systems described, provide for the cyclic flow of particle form solid material through the regeneration and conversion zones which zones are in heat exchange relationship with each other.

Extending across the annular space between shell 10 and casing 13 at levels above the partitions 76 and 77 are the vertically spaced partitions 41 and 42. A plurality of uniformly spaced holes are provided through each of said partitions and covering each of said holes is a hollow, louvered truncated cone 43. Dependent from the top of each cone is a short pipe 44 which extends downwardly through the hole in the partition and terminates therebelow. The pipes 44 are of substantially smaller diameter than said holes in the partitions, leaving an annular space for gas flow therebetween. The arrangements provide substantially solid free gas distributing spaces 45 and 46 directly below the partitions 42 and 41, respectively. A hydrocarbon inlet conduit 38 is connected to the vessel 10 so as to be in communication with space 45 and an inert gas inlet conduit 37 is similarly connected to the vessel adjacent space 46. A hydrocarbon outlet conduit 18 is connected to the vessel near the upper end of conversion zone 35. A combustion gas inlet conduit 36 is connected to the vessel adjacent the substantially solid material free space 75 provided directly below the converging partitions 76 and 77 and a flue gas outlet conduit 19 is provided at the top of chamber 34. Within the lower end of the vessel below the ends of pipes 16, are the vertically spaced horizontal partitions 62, 63 and 64 which have a plurality of properly spaced orifices therein. The orifices in these partitions are so arranged as to divide the solid material flow from the bed of solid material below pipes 16 into a plurality of uniformly distributed streams which are gradually and proportionately combined into relatively few streams flowing into the restricted bottom section 12, from the bottom of which section the solid material passes into conveyor casing 13. This partition and orifice arrangement provides uniform withdrawal of the solid material from the entire cross-section of the bed 101 below pipes 16, thereby insuring a substantially uniform rate of downward solid flow in all of the pipes 16. Within the section 12 are a number of uniformly spaced vertical cooling tubes 49 connected between headers 50 and 51 which, in turn, connect through manifolds 52 and 53 and pipes 54 and 55, respectively, into the vertical drum 56. This drum is provided at its bottom with an inlet pipe 60 for cooling fluid, such as boiler feed water and at its upper end with an outlet pipe 57 for vapor such as steam. A pressure control valve 58 is provided on the steam outlet pipe 57, and a liquid level control mechanism 59, operating the diaphragm valve 61 on inlet pipe 60 is provided to permit control of the water level both within the drum 56 and within the vertical pipes 49. This arrangement provides a means to control the rate of cooling of the solid material within section 12 by simple control of the liquid level in the cooling tubes 49, and permits recovery of the heat removed from the solid material as steam at the desired pressure. It will be apparent that suitable volatile liquids other than water may be used in this apparatus, if desired. Finally, a pipe 22 with valve 23 thereon is provided to permit initial filling of the vessel 10 with particle form solid material and to permit periodic additions of makeup solid said makeup being necessitated by gradual loss of small quantities of fine mesh solid material from the vessel. Likewise pipe 47 with valve 48 thereon is provided at the bottom of the vessel to permit draining the solid material therefrom when desired. It will be understood that the pipes 22 and 47 are not used during the normal cyclic operation of the apparatus except periodically for the purposes above stated.

Considering now the operation, the apparatus is first filled with particle form solid material roughly to the levels shown in Figure 1. The solid material passes downwardly from the chamber 34 as substantially compact columns through the regeneration zone pipes 16 discharging from the lower ends thereof onto bed 101, from which it passes through the orifices in the flow distributing partitions 62, 63 and 64 into the bottom section 12. The solid material then passes from the section 12 into the conveyor casing 13 through apertures 66 therein and is conveyed upwardly as a substantially compact column to be discharged into the conversion zone 35 above the surface of the bed or column of said solid material therein. The height of the bed of solid material within zone 35 may be controlled by opening the ports 71 or 70 in the casing 13 at the desired level. The discharge ports are of sufficient size as to permit discharge of the entire solid material flow substantially at the level of any set of said ports opened. By this provision the hydrocarbon space velocity (volume charge per hour per volume of solid material within conversion zone) may be varied without change in the rate of hydrocarbon throughput thus avoiding upsetting the operation of the product recovery system. The solid material then passed downwardly through the conversion zone 35 and through the pipes 44 extending through partition 42 into the purging zone 104 and then through pipes 73 extending through partition 41 into the seal gas zone 102. The solid material then passes into the conveyor casings 14 and 15 and is conveyed upwardly therethrough and discharged within the chamber 34 thus completing its cycle of travel.

Combustion supporting gas, such as air, is introduced through conduit 36 into the distributing space 75 at rates sufficient to support combustion of the amount of contaminant that is to be burned from the solid material passing through the regeneration zone. The combustion supporting gas enters the lower end of the pipes 16 and passes upwardly therethrough countercurrently to the solid material flow. Spent regeneration gas or flue gas disengages from the solid material bed in chamber 34 and is withdrawn from the top of said chamber through conduit 19. Hydrocarbon vapors heated to the desired conversion temperature in apparatus (not shown) enter through conduit 38 into vapor distributing space 45 and then pass upwardly through the distributing arrangement associated with partition 42. The flow through this distributing arrangement will be described in detail hereinafter. The vapors then pass upwardly through the downwardly flowing column of solid material in zone 35 and disengage from the solid material at the surface 69. The disengaged conversion vapors are then withdrawn through conduit 18. Inert seal and purging gas, such as steam or flue gas, is admitted to the distributing space 46 below partition 41. Part of this gas passes upwardly through the annular space between pipes 73 and the holes in the partition 41 and then through louvered truncated cones into the bed of solid material 104 between partitions 41 and 42. This inert gas passes through the bed 104, stripping the hydrocarbon vapors therefrom and then passes along with the hydrocarbon charge through the conversion zone. Another fraction of the inert gas entering space 46 passes downwardly through the bed of solid material 102 and then upwardly through the conveyor casings 14 and 15, finally mingling with the effluent gases from the regeneration zone in chamber 34. The final fraction of the inert gas enters through inlet vents 72 into the intermediate section of the conveyor casing 13 and passes upwardly and downwardly therethrough.

The rate of admittance of inert gas to space 46 is controlled by diaphragm valve 40 on the inlet conduit 37, said valve being actuated by the differential pressure control device 39 in such a way that the inert gas pressure in space 46 is constantly maintained a fixed amount above the gaseous pressure in the hydrocarbon distributing space 45 thereabove. Moreover, the gaseous pressure in chamber 34 is controlled a fixed amount below that in space 46 by means of throttling valve 20 on the flue gas outlet conduit 19, which valve is actuated by the differential pressure control device 21. This arrangement also automatically provides a seal gas pressure within the central portion of the conveyor casing 13 above that at either end thereof. By the above described pressure control provisions, the interflow of regeneration gas or hydrocarbon vapors between regeneration and conversion zones is not only prevented by the substantially compact columns of solid material in the conveyor casings 13, 14 and 15, acting as seal legs, but by a positive maintenance throughout said casings of an inert gas atmosphere. Although the direction of gas flow through the regeneration and conversion zones, as shown, is preferable because it provides more uniform temperature control throughout these zones in hydrocarbon conversion systems, nevertheless satisfactory operation may be obtained in many cases where the direction of hydrocarbon flow through the conversion zone and that of the regeneration gas through the regeneration zone is reversed. Moreover, the invention is not to be limited by the particular gas distributing and gas collecting provisions shown herein; other conventional gas distributor and collector structure may be substituted, if desired. For example, gas distributors and collectors may be arranged within the regeneration and conversion zones to provide other than vertical flow of the gases therethrough. As will be hereinafter shown, however, the distributing arrangement shown is preferable and particularly well adapted to an apparatus of this type. Other arrangements for maintaining seal gas atmosphere within the conveyor casings may also be provided in place of that shown.

As may be seen from the above description of the apparatus, the conversion and regeneration zones are in heat exchange relationship with each other throughout a substantial portion of their lengths. Thus the heat liberated by combustion of contaminant deposit from the solid material passing through the regeneration zone is transferred through the pipes 16 to the solid material passing through the conversion zone thereby providing heat for the endothermic hydrocarbon conversion reaction conducted within said zone. Obviously an exact heat balance between the conversion reaction and the contaminant combustion reaction may not be obtained for every given set of conversion conditions. The heat required by the conversion reaction may be greater than that liberated by the contaminant conversion or the reverse may be and most often is true in hydrocarbon conversion systems. Thus, for a given set condition of conversion in the conversion zone and for a given set rate of contact material cyclic flow a small amount of heat liberated by contaminant combustion may remain in excess of that required for the conversion of hydrocarbons. In order to prevent a gradual rise in the temperature of the entire cyclic system, this heat should be removed, and the provision of the vertical cooling tubes 49 in the bottom section of the vessel 12 will accomplish this heat removal. As has been shown, the rate of heat removal by these tubes may be easily and accurately controlled by control of the level of volatile liquid heat transfer fluid within said tubes. It will be apparent that the heat removing load has been greatly reduced by the present apparatus design so that the total amount of cooling surface required is only a small fraction of that required in conventional conversion systems. Moreover, since most of the contaminant combustion is removed by heat exchange with the conversion zone, the contact material will not rise to destructive temperatures, while passing through the regeneration zone. Thus, by elimination of the necessity for cooling tubes within the regeneration zone, advantage may be taken of the higher temperature differentials provided by heat transfer fluids maintained at relatively low temperature levels. This, in turn, further reduces the total amount of cooling tubes required. Also since the solid material cooling may be all accomplished at one location instead of at a plurality of stages, as in recently developed multi-stage kilns, a further simplification both in construction and in operation of the cooling system results.

By a novel method of operation, now to be described, the necessity for cooling tubes 49 may be entirely eliminated. It has been experimentally found that for any given set condition of temperature, pressure and hydrocarbon charge rate and catalyst to hydrocarbon charge ratio (pounds of catalyst passed through the conversion zone per pound of hydrocarbon charge) a certain ratio of gasoline to contaminant deposit will result for a given charge stock. If, however, all other conditions are maintained constant and the catalyst throughput rate is increased, an entirely different gasoline to contaminant deposit ratio may be obtained. This may be more clearly understood by consideration of the following tabulated results:

| Charge to the Conversion Zone, #/hr. | | Catalyst to Hydrocarbon Charge Ratio, #/# | 410 E. P. Gasoline Yield, #/hr. | Contaminant Deposited Upon Catalyst Calculated as lbs. Carbon/hr. |
|---|---|---|---|---|
| Gas Oil Hydrocarbon | Catalyst | | | |
| 12,330 | 11,000 | 0.89 | 3,900 | 383 |
| 12,330 | 22,000 | 1.78 | 4,150 | 495 |
| 12,330 | 33,000 | 2.67 | 4,150 | 585 |
| 12,330 | 81,000 | 6.50 | 4,000 | 810 |

In all of the above examples the conversion temperature, pressure and hydrocarbon charge rate were constant. Since the amount of gasoline formed in the conversion reaction is a direct measure of the amount of endothermic heat absorbed by the conversion and since the amount of contaminant deposited by said conversion is a direct measurement of the amount of heat which will be liberated by its combustion in the regeneration zone, it may be seen that by simply varying the cyclic rate of travel of the solid catalytic material in the apparatus of Figure 1, the ratio of the heat liberated in the regeneration zone to the heat required in the conversion zone for hydrocarbon conversion may also be varied. Thus by proper adjustment of the rate of cyclic flow of the solid material, a balanced operation may be obtained wherein the heat released in the regeneration zone is substantially equal to that required for hydrocarbon conversion in the conversion zone, thereby providing a cyclic conversion system wherein a stable range of contact material temperatures may be continuously maintained throughout the system without the requirement for any auxiliary external cooling system at all. This method of operation should not be confused with that method of cyclic operation wherein the cyclic rate of flow of solid material is regulated so as to limit the amount of contaminant deposited on the solid material passing through the conversion zone below that which upon subsequent combustion in the regeneration zone would raise the solid material temperature to heat damaging levels unless external heat removing means are provided within said regeneration zone. This latter method is entirely different from the one contemplated herein and is the subject of another application Serial Number 533,674, filed May 2, 1944, by the present applicant.

As has been shown, the cooling tubes 49 and auxiliary cooling equipment may be entirely eliminated by the method of operation hereinabove disclosed. Since, however, the size of this cooling system is very small and since its use in conjunction with the above method of operation will add increased flexibility to the operation of the apparatus of this invention, such an auxiliary equipment may preferably be provided. It should be added that when the apparatus is used for applications wherein the heat required for conversion is greater than that liberated in the regeneration zone, the tubes 49 may then be used for the purpose of adding heat to the system, in which case a heat transfer fluid, externally heated, would be circulated through the tubes 49.

Turning now to Figure 2, we find a plan view taken at line 2—2 in Figure 1, showing the vessel shell 10, the regenerator tubes 16, the partition 17, from which said tubes depend and the conveyor casings 13, 14 and 15. It should be understood that further conveyors may be provided within the vessel, if desired, in addition to those shown. The use of vessels of other cross-sectional shape is also within the scope of this invention. Moreover, it is not entirely necessary that the lower end of the vessel 10 be reduced, as shown, into a bottom section 12.

Turning now to Fig. 3, we find an enlarged view of one of the vapor distributing devices used in partition 42 of Figure 1. In Figure 3, 42 is a part of said partition, 43 is a truncated hollow cone covering one of the holes through said partition and 44 is a pipe dependent from the top of said truncated cone. The pipe 44 being smaller in diameter than the hole in the partition 42 provides an annular space 79 for vapor flow. Louvered openings 80 are provided in the truncated cone, said openings being such as to permit flow of vapors therethrough into the solid material in the conversion zone while substantially preventing gravitational flow of solid material therethrough. In operation, solid material may pass downwardly through pipe 44 from the conversion zone while hydrocarbon vapors may pass from the distributing space 45 below the partition upwardly through the annular space 79 and louvers 80 into the conversion zone. Such an arrangement prevents interference with the solid flow through pipes 44 that might otherwise occur, due to the high velocity of the hydrocarbon vapors at this location. It will be seen from Figure 2, that due to the great number of pipes 16 which extend through the partition 42, the use of vapor distributing channels which extend across the vessel is impossible. Thus the arrangement, above described, provides a simple, sturdy and efficient means for distributing inlet vapors or for collecting outlet vapors in an apparatus of this type. It should be noted that other members, such as truncated pyramids, may be substituted for the truncated cones, shown therein. The above described arrangement, which is shown in detail in Figure 3, is the subject of claims in my divisional application, Serial No. 679,728, filed in the United States Patent Office on June 27, 1946.

Turning now to Figure 4, we find a section of the conveyor casing 13, through which extends the screw conveyor drive shaft 82. It will be seen that the screw conveyor differs from conventional types in that the spiral flange 65 shown in Figure 1 is not the usual spiral flange but is composed of a spiral flange 85 which extends horizontally substantially short of the casing wall, and attached along the flange 85 is the spring metal tip 86 which presses against the casing wall. In ordinary screw conveyors a relatively heavy spiral flange would extend horizontally to within a short distance of the casing wall thereby leaving a space between the casing wall and the edge of flange which would become filled with the particle form solid material being conveyed. Such material would be crushed in this space as it passed through the conveyor, thereby resulting in considerable and undesirable breakdown in the size thereof. In the construction shown herein, the spring metal tip is made of very thin metal so as to prevent undue friction in the conveyor operation. On the other hand, by pressing against the conveyor wall, it eliminates the space between the edge of the conveyor flange and the conveyor wall, thereby eliminating the crushing of the solid material. This is of considerable importance in cyclic conversion systems of the type herein described, wherein it is very desirable, both from a standpoint of economics and of proper operation in the entire cyclic system to limit the solid material attrition to a minimum. It will be understood that while the hereinabove described conveyor is a preferably type for use in the apparatus of this invention, other conveyors of other types may be used provided that such conveyors are of a type which will convey the solid material upwardly as a substantially compact column, thereby providing highly important vapor seal legs.

It may be seen from the above description of this invention that by elimination of all or at least the major part of the auxiliary heat removal apparatus and by the incorporation of substantially the entire cyclic conversion apparatus within a single vessel, a relatively simple, compact and economical cyclic conversion system has been provided which may be constructed in sizes suitable for small refineries at costs substantially below those of conventional systems. Moreover, by direct supply of the heat required for hydrocarbon conversion from the regeneration zone, the necessity for providing the heat for reaction to the conversion zone by means of heat transfer circulation systems or by means of superheating the conversion charge above the desired conversion temperature is eliminated. Thus the conversion reaction may be substantially entirely conducted at the optimum conversion temperature rather than over a range of temperatures above and below said optimum. Another advantage of the apparatus of this invention lies in the fact that units having a hydrocarbon charge capacity of the order of 1000 to 4000 barrels per day (42 gallon barrels of liquid hydrocarbons) may be constructed and substantially assembled in the fabrication shops before shipment to the small refineries. Such units may then be easily and quickly installed in the field with a minimum of cost and trouble. The small amount of space occupied by such apparatus will permit its installation in small refineries between existing thermal cracking furnaces and product fractionation recovery equipment, thereby permitting the use of the existing equipment for stock preparation for the new apparatus and for recovery of product therefrom. Due to the large amount of space required by conventional cyclic conversion systems, the tie-in of such systems with existing thermal cracking equipment has not been heretofore feasible in most instances.

The proper design of the apparatus of this invention is dependent upon a number of variables which are inherent in any particular application. Such variables are the nature of the hydrocarbon stock and the nature of its conversion contemplated, the general type and nature of the particle form contact material, the possible rate of the specific regeneration and conversion reactions involved and the heat transfer characteristics of the solid material vapor system involved. Generally, in order to provide proper contact material temperature control within the regeneration zone, in the case of clay-type catalyst particles used in hydrocarbon conversion systems, the maximum distance of a solid material particle from a heat transfer surface (i.e., walls of the regeneration vessel) should be less than two inches and preferably of the order of one inch. In relation to the rates of gas or vapor flow through the substantially compact beds or columns of solid material within the reaction and regeneration zones, it may be said that sufficient cross-section for gas flow should be provided to limit the pressure drops due to the flow thereof through the solid material below that which would cause disruption or boiling of said solid material. Such pressure drop data for the particular gases or vapors and particle form solid to be used may be readily obtained by simple experiments with these materials or may be calculated from existing data. Similar provision of sufficient cross-section for gas flow should be provided at the locations of disengagement of effluent gas from the solid material within the apparatus.

It should be understood that the invention is not limited to operations involving hydrocarbon conversion but may be applied to other operations involving endothermic and exothermic reactions in the presence of moving particle form solid material. It should be further understood that the foregoing illustrations of the construction, operation and application of this invention are merely exemplary in character and are in no way intended to limit the scope of this invention.

I claim:

1. An apparatus for conversion of hydrocarbon vapors in the presence of a column of downwardly moving particle form solid contact mass material and for regenerating said solid material comprising: an elongated vertical vessel closed on both ends, means defining a separate regeneration and a separate conversion zone within said vessel, said zones extending vertically through the major length of said vessel in heat exchange relationship with each other, the major portion of the wall of one zone being in heat transfer relationship with the other zone, said conversion and regeneration zones being suitable for maintenance therein of substantially compact columns of downwardly flowing particle form solid contact mass material, enclosed conveying means to convey said solid material upwardly through said vessel from the lower section of said regeneration zone to the upper section of said conversion zone, similar conveying means to convey said solid material upwardly through said vessel from the lower section of said conversion zone to the upper section of said regeneration zone, means to maintain an essentially inert gas atmosphere within each of said conveying means thereby excluding conversion vapors and regeneration gases therefrom, means to pass hydrocarbon vapors through said solid material within said conversion zone at controlled temperatures and pressures, means to pass regeneration gas through said solid material within said regeneration zone.

2. An apparatus for conversion of hydrocarbons in the presence of moving particle form catalyst and for regeneration of said catalyst comprising: an elongated vertical vessel closed on both ends, a partition arrangement within said vessel defining separate vertical, elongated conversion and regeneration zones in heat transfer relationship with each other, the major portion of the total wall area of one zone being in heat transfer relationship with the other zone, said zones being suitable for confining therein substantially compact columns of said catalyst, said partition arrangement also defining a separate accumulation zone for said catalyst below and in communication with said conversion zone and a separate accumulation zone for said catalyst below and in communication with said regeneration zone, at least one enclosed mechanical conveyor for conveying said catalyst upwardly through said vessel between said accumulation zone below said regeneration zone and the upper section of said conversion zone, at least one enclosed mechanical conveyor for conveying said catalyst upwardly through said vessel between said accumulation zone below said conversion zone and the upper section of said regeneration zone, said conveyors being of such type as will move said catalyst upwardly as substantially continuous compact columns, means to maintain inert gaseous atmosphere substantially throughout the length of said conveyors, inlet means to admit hydrocarbon vapors at controlled temperatures to said conversion zone, outlet means for vapor products from said conversion zone, said outlet means being remotely positioned from said inlet means, inlet means to admit regeneration gas to said regeneration zone and outlet means for gases therefrom, said regeneration gas outlet means being remotely positioned from said regeneration gas inlet means.

3. An apparatus of the type described for continuously converting hydrocarbon vapors in the presence of a particle form solid adsorbent material and for continuously regenerating said solid material comprising: an elongated vertical closed vessel, partitioning within said vessel defining separate elongated, vertical conversion and reregeneration zones in heat exchange relationship with each other, said zones being suitable for confining substantially compact elongated columns of said particle form solid adsorbent material, further partitioning defining a drain zone directly below and in communication with said conversion zone and a drain zone directly below and in communication with said regeneration zone, at least one cylindrical casing extending upwardly within said vessel from said solid material drain zone below said conversion zone, said casing having inlet apertures for said solid material near its lower end and discharge openings for solid material within the upper section of said regeneration zone, at least one cylindrical casing extending upwardly within said vessel from said solid material drain zone below said regeneration zone, said casing having apertures near its lower end for inlet of said solid material and discharge openings within the upper section of said conversion zone, drive shafts extending centrally through each of said casings to locations outside said vessel, a spiral flange attached along the major length of each of said drive shafts, said spiral flanges projecting horizontally short of the inside walls of said casings, a spring metal tip attached along the length of each of said spiral flanges, said tip projecting horizontally so as to press against the inside periphery of said cylindrical casing, means to rotate said drive shaft, said drive means being located without said vessel, means to maintain inert gaseous pressure within said casings substantially throughout their lengths, means to admit and distribute hydrocarbon vapors within said conversion zone and means to collect and withdraw gaseous conversion products from said zone, means to admit and distribute regeneration gases to said regeneration zone and means to collect and withdraw gases therefrom.

4. An apparatus for conversion of hydrocarbon vapors in the presence of a moving particle form solid contact material and for regeneration of said solid material comprising: an elongated vertical closed vessel, partitioning within said vessel defining a separate vertical elongated regeneration zone and a separate vertical elongated conversion zone, said zones being in heat exchange relationship with each other and said zones being suitable for confining therein substantially compact columns of said particle form solid material, the major portion of the walls of one zone being in heat transfer relationship with the other zone, further partitioning defining a drain zone for solid material below and in solid flow communication with said conversion zone and a separate drain zone for solid material below and in solid flow communication with said regeneration zone, means to pass hydrocarbon vapors at controlled temperatures and pressures through the solid material column within said conversion zone, means to pass regeneration gas through the solid material column within said regeneration zone, means to pass inert gas through at least a portion of the solid material accumulation in said drain zone below said conversion zone and means to maintain the pressure of said inert gas within said drain zone above the pressure in said conversion and regeneration zones, means to convey said solid material as a confined substantially compact column upwardly through said vessel from said drain zone below said conversion zone to the upper end of said regeneration zone, means to convey said solid material as a confined substantially compact column upwardly through said vessel from said drain zone below said regeneration zone to the upper end of said conversion zone, means to maintain a substantially inert gaseous atmosphere within said last named conveying means.

5. An apparatus for conversion of hydrocarbon vapors in the presence of a moving particle form solid contact material and for regeneration of said solid material comprising: an elongated vertical closed vessel, partitioning within said vessel defining a separate vertical elongated conversion zone and a separate vertical elongated regeneration zone, said zones being in heat exchange relationship with each other and said zones being suitable for confining therein substantially compact columns of said particle form solid material, one of said zones being substantially disposed within the other zone, said partitioning also defining a drain zone for solid material below and in solid flow communication with said conversion zone and a separate drain zone for solid material below and in solid flow communication with said regeneration zone, means to pass hydrocarbon vapors at controlled temperatures and pressures through the solid material column within said conversion zone, means to pass regeneration gas through the solid material column within said regeneration zone, means to pass inert gas through at least a portion of the solid material accumulation in said drain zone below said conversion zone and means to maintain the pressure of said inert gas within said drain zone above the pressure in said conversion and regeneration zones, means to remove heat from said solid material at controlled rates within said drain zone below said regeneration zone, means to convey said solid material as a confined substantially compact column upwardly through said vessel from said drain zone below said conversion zone to the upper end of said regeneration zone, means to convey said solid material as a confined substantially compact column upwardly through said vessel from said drain zone below said regeneration zone to the upper end of said conversion zone, means to maintain a substantially inert gaseous atmosphere within each of said conveying means.

6. An apparatus according to claim 2, characterized in that each of said mechanical conveying means is provided with means for adjustment of the operation speed thereof, said speed adjustment means being located wtihout said vessel.

7. An apparatus of the type described for conversion of hydrocarbon vapors in the presence of a moving column of particle form solid contact mass material and for simultaneously regenerating a moving column of spent contact mass material comprising: a closed, elongated vertical vessel, a horizontal partition extending across said vessel within the upper end thereof, said partition defining a chamber suitable for confining a bed of said solid material, a plurality of uniformly distributed open end vertical pipes dependent from said partition and terminating short of the lower end of said vessel, said pipes serving to provide a regeneration zone through which said solid material may flow from said chamber above said partition to the lower end of said vessel, said pipes also defining a conversion and purging zone in the space within said vessel and along their length not occupied by said pipes, partitioning across said vessel shortly above the lower ends of said pipes, said partitioning serving to provide a drain section within the lower end of said vessel below said pipes, which drain section is sealed from said conversion and purging zone, means to pass hydrocarbon vapors at controlled temperatures and pressures through the solid material in the upper portion of said conversion and purging zone, means to disengage vapor products from said solid material and withdraw them from said zone, means to pass an inert gas through the solid material in the lower portion of said zone and means to control the inert gaseous pressure in said lower portion of said zone above the pressure in the hydrocarbon flow section of said zone and above the pressure in said regeneration zone, means to pass regeneration gas through said solid material in said regeneration zone, means to disengage gas from said solid material and means to withdraw it from said regeneration zone, at least one conveyor casing extending within said vessel between the lower end of said conversion and purging zone and the upper section of said chamber within the top of said vessel, said casing having apertures opening laterally for admittance of said solid material near its lower end and discharge openings near its upper end, at least one conveyor casing extending within said vessel between said drain zone below said regeneration zone pipes and the upper section of said conversion and purging zone, said casing having inlet apertures for solid material near its lower end and outlet apertures near the top of said conversion zone, mechanical conveyors within said casings of the type adapted to lift said solid material as a substantially compact column within said casings, adjustable speed drive means for said conveyors located without said vessel, means to maintain an inert gas pressure at a point within said second named conveyor casing intermediate the ends thereof which pressure is above the gaseous pressure at said ends, vertical cooling tubes within said drain section below said regeneration zone pipes and means to control a cooling fluid level within said tubes.

8. A method for converting hydrocarbon vapors in the presence of a particle form solid contact material and for regenerating said solid material comprising the following steps: passing said solid material cyclically through a conversion zone and a regeneration zone which are in such heat exchange relationship with each other that the maximum distance of any contact material particle in the regeneration zone from a surface of heat transfer with said conversion zone is less than about one inch, passing hydrocarbon vapors at a controlled rate and temperature through said conversion zone in contact with said solid contact material, while preventing the flow of said vapors into said regeneration zone, passing combustion supporting gas through said regeneration zone in contact with spent solid contact material at a controlled rate and temperature thereby burning from said solid contact material contaminant deposited thereon in said conversion zone, said regeneration gas being substantially prevented from entering said conversion zone, and at the same time selectively counteracting any substantial trend towards change in the range of temperatures of said solid contact material in said conversion zone and in said regeneration zone by adjustment of the rate of cyclic flow of said solid contact material, the adjustment being in a direction opposite to the direction of said trend towards change in the range of temperatures in said conversion and regeneration zones.

9. A method for simultaneously conducting endothermic and exothermic reactions comprising the steps: cyclically passing a particle form solid contact material first through a reaction zone wherein it is contacted with gases undergoing an endothermic reaction resulting in gaseous products and in the depositing of a contaminant upon said solid contact material, and secondly, through an exothermic reaction zone wherein it is contacted with a combustion supporting gas which burns said contaminant deposit therefrom, said endothermic and exothermic reaction zones being positioned in heat exchange relationship with each other so as to permit exchange of the opposite heats of reaction, the maximum distance of any contact material particle in said exothermic reaction zone from a surface of heat transfer being less than about two inches and at the same time rectifying any pronounced trend towards change in the temperature ranges of said solid material within said endothermic reaction and within said exothermic reaction zone, at least partially, by adjustment in the rate of cyclic flow of said solid contact material, the adjustment in the rate of cyclic flow of contact material being an increase in rate of flow when said trend is towards a decrease in temperature ranges and the adjustment being a decrease in rate of contact material flow when said trend is towards an increase in temperature ranges.

10. A method for converting hydrocarbons in the presence of a particle form solid contact material and of regenerating said solid material while controlling the temperature of said material during the conversion and regeneration reactions comprising: passing said solid material as a substantially compact column of downwardly flowing particle form solid material downwardly through a confined conversion zone, conveying said solid material discharging from said conversion zone to a location of introduction to a confined regeneration zone, passing said solid material as a substantially compact column downwardly through said regeneration zone, said regeneration zone being in heat exchange relationship with said conversion zone at least along the major length thereof and the maximum distance of any solid particle in said regeneration zone from a surface of heat transfer with said conversion zone being less than about two inches, conveying said solid material discharging from said regeneration zone to a location of introduction to said conversion zone thereby completing a cyclic system of solid material travel, passing hydrocarbons under conditions suitable for the conversion thereof through said solid material flowing within said conversion zone while substantially preventing the flow of said hydrocarbons into said regeneration zone, the conversion of said hydrocarbons resulting in gaseous products and in the deposition of a contaminant upon said solid material, passing combustion supporting gas through said solid flowing within said regeneration zone while substantially preventing the flow of said gas into said conversion zone, said combustion supporting gas serving to burn said contaminant from said solid material; and at the same time maintaining substantially fixed the temperature range of said cyclically traveling solid material within said regeneration zone and within said conversion zone partially by subjecting said solid material to heat exchange with an externally controlled heat exchange medium at that phase of its travel which is between the regeneration zone discharge and the conversion zone inlet, and partly by control of the rate of cyclic travel of said solid material, the rate of solid material travel being increased if said temperature range tends to fall and the rate of solid material travel being decreased if said temperature range tends to rise.

11. A method for conversion of hydrocarbon vapors in the presence of a particle form solid contact mass material and for regeneration of said solid material while controlling the temperature of said solid material during the conversion and regeneration reaction comprising: passing said solid material as substantially compact columns of particle form solid material cyclically through a confined conversion zone and a confined regeneration zone which are in such heat exchange relationship with each other that the maximum distance of any particle of contact material in said regeneration zone is less than about one inch from a surface of heat transfer with said conversion zone, passing hydrocarbon vapors at a controlled rate and temperature through said conversion zone in contact with said solid contact material while preventing the flow of said vapors into said regeneration zone, passing combustion supporting gas through said regeneration zone in contact with spent solid contact material at a controlled rate and temperature thereby burning from said solid contact material contaminant deposited thereon in said conversion zone, said regeneration gas being substantially prevented from entering said conversion zone; and at the same time counteracting any pronounced trend towards change in the ranges of temperature of said solid contact material in said conversion zone and in said regeneration zone by an adjustment of the rate of cyclic flow of said solid contact material, said adjustment being in a direction opposite to the trend towards change in the temperature ranges.

12. A method for conversion of hydrocarbon vapors in the presence of a particle form solid contact mass material and for regeneration of said solid material while controlling the temperature of said solid material during the conversion and regeneration reaction comprising: passing said solid material as substantially compact columns of particle form solid material cyclically through a confined conversion zone and a confined regeneration zone which are in such indirect heat transfer relationship with each other that the maximum distance of any solid particle in the regeneration zone from a surface of heat transfer with the conversion zone is less than about two inches, passing hydrocarbon vapors at a controlled rate and temperature through said conversion zone in contact with said solid contact material while preventing the flow of said vapors into said regeneration zone, passing combustion supporting gas through said regeneration zone in contact with spent solid contact material at a controlled rate and temperature thereby burning from said solid contact material contaminant deposited thereon in said conversion zone, said regeneration gas being substantially prevented from entering said conversion zone; and at the same time maintaining substantially fixed ranges of temperature of said solid contact material in said conversion and regeneration zones by adjustment of the rate of cyclic flow of said solid contact material, the adjustment in the rate of solid flow being in a direction opposite to the direction of any change in said ranges of temperature.

13. A method for converting hydrocarbon vapors in the presence of a particle form solid contact material and for regenerating said solid material comprising the following steps: passing said solid material cyclically through a conversion zone and a regeneration zone which are in such heat exchange relationship with each other that any particle of contact material in said regeneration zone is less than about two inches away from a surface of heat transfer with said conversion zone, passing hydrocarbon vapors at a controlled rate and temperature through said conversion zone in contact with said solid contact material, while preventing the flow of said vapors into said regeneration zone, passing combustion supporting gas through said regeneration zone in contact with spent solid contact material at a controlled rate and temperature thereby burning from said solid contact material contaminant deposited thereon in said conversion zone, said regeneration gas being substantially prevented from entering said conversion zone, and at the same time maintaining a substantial thermal balance between said conversion and regeneration zone by adjustment of the rate of cyclic flow of said solid contact material, the adjustment of the rate of cyclic flow of said solid contact material being downward if the temperature ranges in said conversion and regeneration zones tend to rise above the desired, suitable level and being upward if the temperature ranges in said conversion and regeneration zones tend to fall below the desired, suitable level.

14. An apparatus for conversion of hydrocarbons in the presence of moving particle form catalyst and for regeneration of said catalyst comprising: an elongated vertical vessel closed on both ends, a partition arrangement within said vessel defining separate vertical, elongated conversion and regeneration zones in indirect heat transfer relationship with each other, wherein the maximum distance from any point in the regeneration zone to a wall in heat transfer relationship with the conversion zone is less than about two inches, said zones being suitable for confining therein substantially compact columns of said catalyst, said partition arrangement also defining a separate accumulation zone for said catalyst below and in communication with said conversion zone and a separate accumulation zone for said catalyst below and in communication with said regeneration zone, at least one enclosed mechanical conveyor for conveying said catalyst upwardly through said vessel between said accumulation zone below said regeneration zone and the upper section of said conversion zone, at least one enclosed mechanical conveyor for conveying said catalyst upwardly through said vessel between said accumulation zone below said conversion zone and the upper section of said regeneration zone, said conveyors being of such type as will move said catalyst upwardly as substantially continuous compact columns, means to maintain inert gaseous atmosphere substantially throughout the length of said conveyors, inlet means to admit hydrocarbon vapors at controlled temperatures to said conversion zone, outlet means for vapor products from said conversion zone, said outlet means being remotely positioned from said inlet means, inlet means to admit regeneration gas to said regeneration zone and outlet means for gases therefrom, said regeneration gas outlet means being remotely positioned from said regeneration gas inlet means.

15. A method for converting hydrocarbons in the presence of a particle form solid contact material and of regenerating said solid material while controlling the temperature of said material during the conversion and regeneration reactions comprising: passing said solid material as a substantially compact column of downwardly flowing particle form solid material downwardly through a confined conversion zone, conveying said solid material discharging from said conversion zone upwardly in a confined passage through said conversion zone and in indirect heat transfer relationship with the contact material in said conversion zone to a location of introduction to a confined regeneration zone, passing said solid material as a substantially compact column downwardly through said regeneration zone, said regeneration zone being in heat exchange relationship with said conversion zone and substantially surrounded thereby at least along the major portion of its length, conveying said solid material discharging from said regeneration zone upwardly in a confined passage through said conversion zone and in indirect heat transfer relationship with the contact material in said conversion zone to a location of introduction to said conversion zone thereby completing a cyclic system of solid material travel, passing hydrocarbons under conditions suitable for the conversion thereof through said solid material flowing within said conversion zone while substantially preventing the flow of said hydrocarbons into said regeneration zone, the conversion of said hydrocarbons resulting in gaseous products and in the deposition of a contaminant upon said solid material, passing combustion supporting gas through said solid flowing within said regeneration zone while substantially preventing the flow of said gas into said conversion zone, said combustion supporting gas serving to burn said contaminant from said solid material; and at the same time maintaining a substantially fixed contact material temperature range in said conversion zone and a substantially fixed contact material temperature range in said regeneration zone by adjustment of the rate of cyclic flow of said solid contact material.

16. A method for converting hydrocarbons in the presence of a particle form solid contact material and of regenerating said solid material while controlling the temperature of said material during the conversion and regeneration reactions comprising: passing said solid material as a substantially compact column of downwardly flowing particle form solid material downwardly through a confined conversion zone, conveying said solid material discharging from said conversion zone to a confined accumulation of said solid material located above said conversion zone, passing solid material from said accumulation in a plurality of substantially compact confined uniformly spaced apart streams downwardly through said conversion zone in indirect heat transfer relationship with the contact material in said conversion zone, said confined streams constituting together a regeneration zone, conveying said solid material discharging from said plurality of confined streams to a location of introduction to said conversion zone thereby completing a cyclic system of solid material travel, passing hydrocarbons under conditions suitable for the conversion thereof through said solid material flowing within said conversion zone while substantially preventing the flow of said hydrocarbons into said regeneration zone, the conversion of said hydrocarbons resulting in gaseous products and in the deposition of a contaminant upon said solid material, passing combustion supporting gas through said solid flowing within said regeneration zone while substantially preventing the flow of said gas into said conversion zone, said combustion supporting gas serving to burn said contaminant from said solid material; and at the same time selectively controlling the range of temperatures of said solid contact material in said conversion zone and the range of temperatures in said regeneration zone by adjustment of the rate of cyclic flow of said solid contact material, the adjustment in the rate of solid flow being upward if the range of temperatures is lower than desired and downward if the range of temperatures is higher than desired.

ERNEST UTTERBACK.

REFERENCES CITED

The following references are of record in the file of this patent:

UNITED STATES PATENTS

| Number | Name | Date |
| --- | --- | --- |
| 2,248,196 | Plummer | July 8, 1941 |
| 2,253,486 | Belchetz | Aug. 19, 1941 |
| 2,263,363 | Menshih | Nov. 18, 1941 |
| 2,311,984 | Guild | Feb. 23, 1943 |
| 2,341,193 | Scheineman | Feb. 8, 1944 |
| 2,350,730 | Degnen et al. | June 6, 1944 |
| 2,378,342 | Voorhees et al. | June 12, 1945 |
| 2,363,874 | Krebs | Nov. 28, 1944 |
| 1,496,094 | Moetteli | June 3, 1924 |
| 1,386,768 | Day | Aug. 9, 1921 |
| 2,351,214 | Kaufmann et al. | June 13, 1944 |

FOREIGN PATENTS

| Number | Country | Date |
| --- | --- | --- |
| 533,037 | Germany | Sept. 8, 1931 |